Sept. 19, 1950. F. P. WILLCOX 2,522,699
ACTUATING MEANS FOR PHOTOGRAPHIC SHUTTERS
Filed June 14, 1947 4 Sheets-Sheet 1

INVENTOR
FREDERICK P. WILLCOX
BY
ATTORNEY

Sept. 19, 1950          F. P. WILLCOX          2,522,699
ACTUATING MEANS FOR PHOTOGRAPHIC SHUTTERS Filed June 14, 1947          4 Sheets-Sheet 3

INVENTOR
FREDERICK P. WILLCOX
ATTORNEY

Sept. 19, 1950         F. P. WILLCOX         2,522,699
ACTUATING MEANS FOR PHOTOGRAPHIC SHUTTERS
Filed June 14, 1947         4 Sheets-Sheet 4

TYPICAL SPACE-TIME CURVE FOR A SINGLE TOGGLE SHUTTER BLADE

TYPICAL SPACE-TIME CURVE FOR A DOUBLE TOGGLE SHUTTER BLADE

INVENTOR
FREDERICK P. WILLCOX
BY
Rodney C. Southworth
ATTORNEY

Patented Sept. 19, 1950

2,522,699

UNITED STATES PATENT OFFICE 2,522,699

ACTUATING MEANS FOR PHOTOGRAPHIC SHUTTERS

Frederick P. Willcox, Washington, D. C., assignor to General Aniline & Film Corporation, New York, N. Y., a corporation of Delaware Application June 14, 1947, Serial No. 754,631

2 Claims. (Cl. 95—63)

This invention pertains to certain improvements in shutters of the between-the-lens type and, more particularly, to improvements in the mechanism of such shutters which imparts the opening and closing movements to the shutter blades.

Among the objects of the invention is that of providing for greater speed of operation during both the opening and closing movements of the blades.

Another object of the invention is that of supplementing the more or less conventional crank operating means for such shutters by a toggle mechanism adapted so to modify the harmonic motion of the first mechanism as to improve shutter operation and to make the closing movement of the shutter conform more closely to that of the opening thereof.

Another object of the invention is that of devising a means for imparting the power from the shutter motor or other power means to the shutter blades in such manner that most all phases of the shutter opening and closing movements will be accelerated except the latter part of the closing movement which is so modified as to slow down movement of the parts just prior to the time when the shutter blades come to rest.

It is a further object of the invention to provide means for accomplishing the above-mentioned results while employing the simple and more or less conventional blade assembly, blade ring, spring actuated master member, and the conventional disengageable link directly connected to the master member and which has imparted to it a somewhat modified harmonic motion.

According to the prior art, shutters of the between-the-lens type having a plurality of blades opening symmetrically about a center are commonly actuated by a spring operated master member which is pivoted outside the blade assembly but within the shutter casing. Such a master member may be set by rotating it against the tension of its operating spring to a latched position from which it is released by the trigger or other releasing means. Such a rotating member only makes a partial revolution and its movement is imparted to the blades through a link connected to the said master member and releasably connectable to the means for interconnecting the blades and for causing them to swing about their respective pivots thereby to open and to close them about the optical center of the lens and shutter assembly. Movement throughout a restricted angular extent is first imparted in one direction for opening the blades and thereafter corresponding movement, but in a reversed direction causes the return of the blades to their initial or closed position. The general layout of this mechanism is such that the partial revolution made by the master member is more or less equally disposed at either side of a line defining the so-called dead center of the mechanism, or that point at which the opening blades are arrested just prior to the start of movement in the opposite direction for closing them. Such an operating means tends to function in accordance with the laws of simple harmonic motion, although the theoretical movement is rather drastically altered by the friction and inertia of parts, and the difference between the initial and final tension in the spring motor as the master member moves from its cocked to its uncocked position.

During the opening movement, the spring motor is set at its greatest tension and, therefore, the mechanism applies a relatively great amount of force directed toward opening the blades. However, at that time, parts start from rest and, therefore, the inertia forces which are to be overcome along with the friction in the mechanism are relatively great so the starting movement accelerates and builds up to a speed which may be considered more or less a maximum for the size and mass of the particular shutter under consideration. The blades must stop momentarily prior to closing and very conveniently the harmonic motion provides for slowing down the blade mechanism itself even though the master member may still continue to build up its speed and does actually build up extreme speed during that part of the operation in which the mechanism is at or very close to its dead center position. While at many of the shutter speeds, movement is arrested in the open position, those are the slower speeds, and since the highest speed for which any particular shutter is designed is most critical, it is to be understood that the present discussion has reference to the highest attainable speed and, therefore, the master member may be considered free to move from one extreme position to the other without any intermediate dwell.

The closing movement is not greatly accelerated at the start, but due to the fact the master member is moving away from its dead center position, it naturally tends to increase the blade speed in accordance with the laws of harmonic motion. The spring will have lost some of its tension, but that is more or less counteracted by the fact that the master member is free to attain a very high angular speed while passing through the dead center region. Now, in contrast to what took place during the opening movement, the blades, except for the loss in power to be derived from the spring motor, merely build up speed until they reach the end of the closing movement at which time, in the conventional mechanism, they are stopped very abruptly and often times with considerable shock. As evidence of the above mentioned fact, it is commonly known that such shutters are subject to rebounding of the blades when they reach their closed position and many devices have been suggested for damping the effect of that tendency to rebound.

According to the invention herein described and claimed, the conventional master member and link to which it imparts the modified harmonic motion is supplemented by a toggle mechanism for which the dead center position is substantially opposite in phase from the dead center of the master member. The said toggle mechanism is simple in construction, very rugged, and increases the number of parts and the complication of the shutter very little. The link normally connected to the master member and to which it imparts motion is connected to one member of said toggle and is disconnectable therefrom in more or less the same general manner as the counterpart of that link is disconnectable from the blade connecting master member in the conventional shutter of this type.

The mechanism may be considered as a double toggle mechanical movement, each joint of which is out of phase or substantially opposite in phase from the other. In other words, the master member and its link which comprise the first toggle in the train or series is in fully broken (opposite dead center) position when the second toggle is at its straightened or dead center position.

The invention will be described hereinafter in greater detail as the same is applied to a between-the-lens type shutter. It is to be understood that the particular shutter shown is employed merely by way of illustration and that the invention may be applied to any and all shutters to which these principles are applicable. The invention is herein described by reference to the accompanying figures of drawing, in which.

Now referring to the figures of drawing, one form of the invention will be described. The complete shutter mechanism, that is, the various controls for time and bulb exposures, etc., have not been illustrated and will not be described since they may be of any suitable or conventional type and are not necessary to an understanding of the invention of this case.

Figure 4:
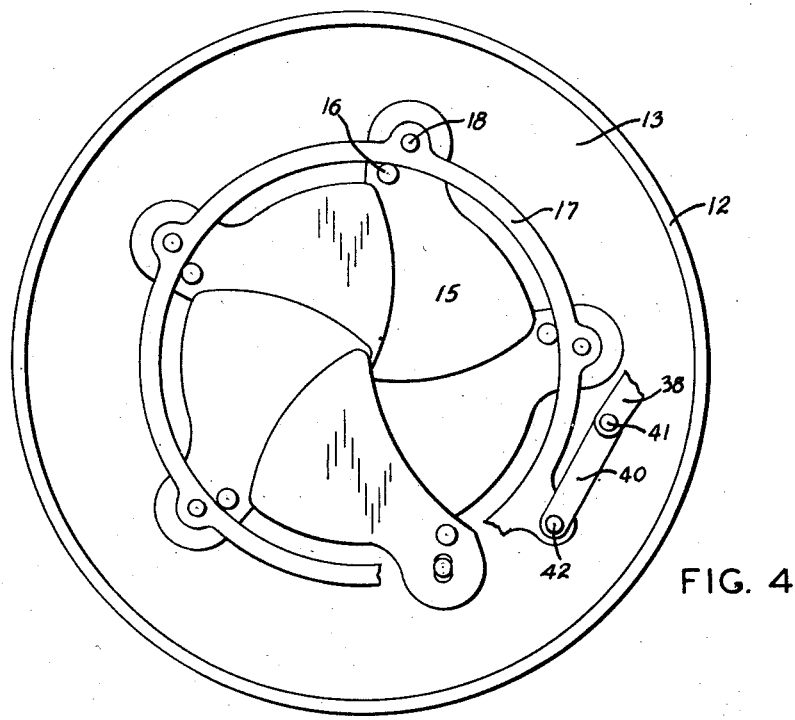
Fig. 4 is an elevation of part of the shutter behind the mechanism plate and including the blades, blade pivots, blade ring, and the second portion of the double toggle to which the blade ring is connected.

The shutter may be housed within the usual annular casing 10 having inner and outer tubular members 11 and 12, a back plate 13 and a mechanism plate 14 intermediate the back plate and the face of the shutter. A plurality of blades 15, better shown in Fig. 4, are pivoted at 16 and may be swung about the said pivots by movement of a blade ring 17. The blade ring is connected to each of the blades at the outer portions thereof by a pin 18 engaging a slot in the blade, and a relatively short angular movement of the ring results in swinging of the blades to open or to closed position, as the base may be, in a manner now well known to those skilled in the art.

Here, five blades have been illustrated as comprising a complete assembly, but it is to be understood that a smaller or greater number may be used, or in fact, the shutter may comprise only a single blade in which event that blade will be of such shape and size as to cover the optical opening of the lens.

Figure 1:
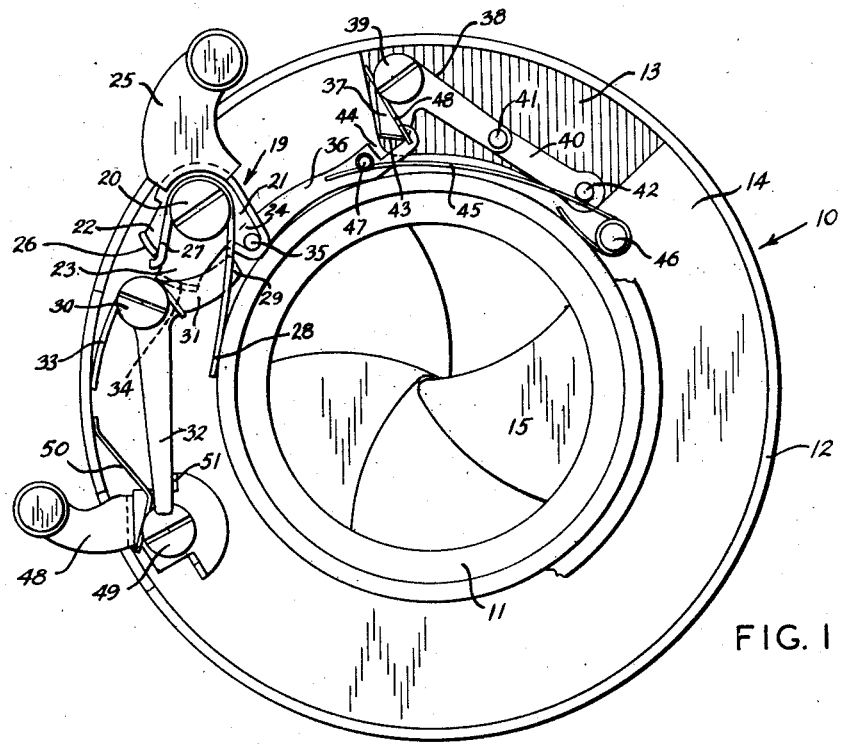
Fig. 1 is an elevation showing certain parts of a shutter to which the invention has been applied, the shutter being shown in uncocked position.
Figure 2:
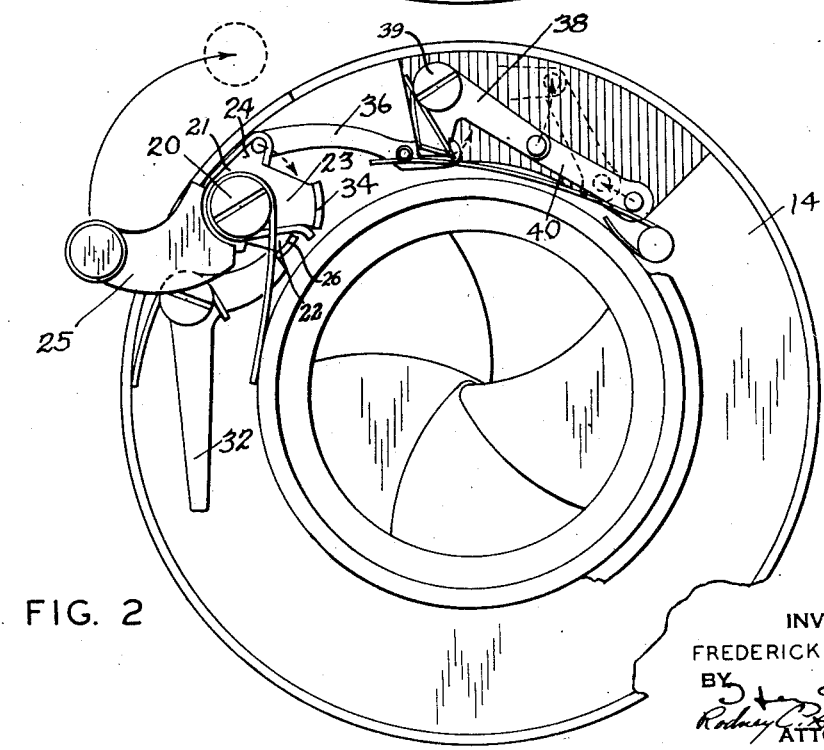
Fig. 2 is a view similar to Fig. 1 but showing the shutter cocked.
Figure 3:
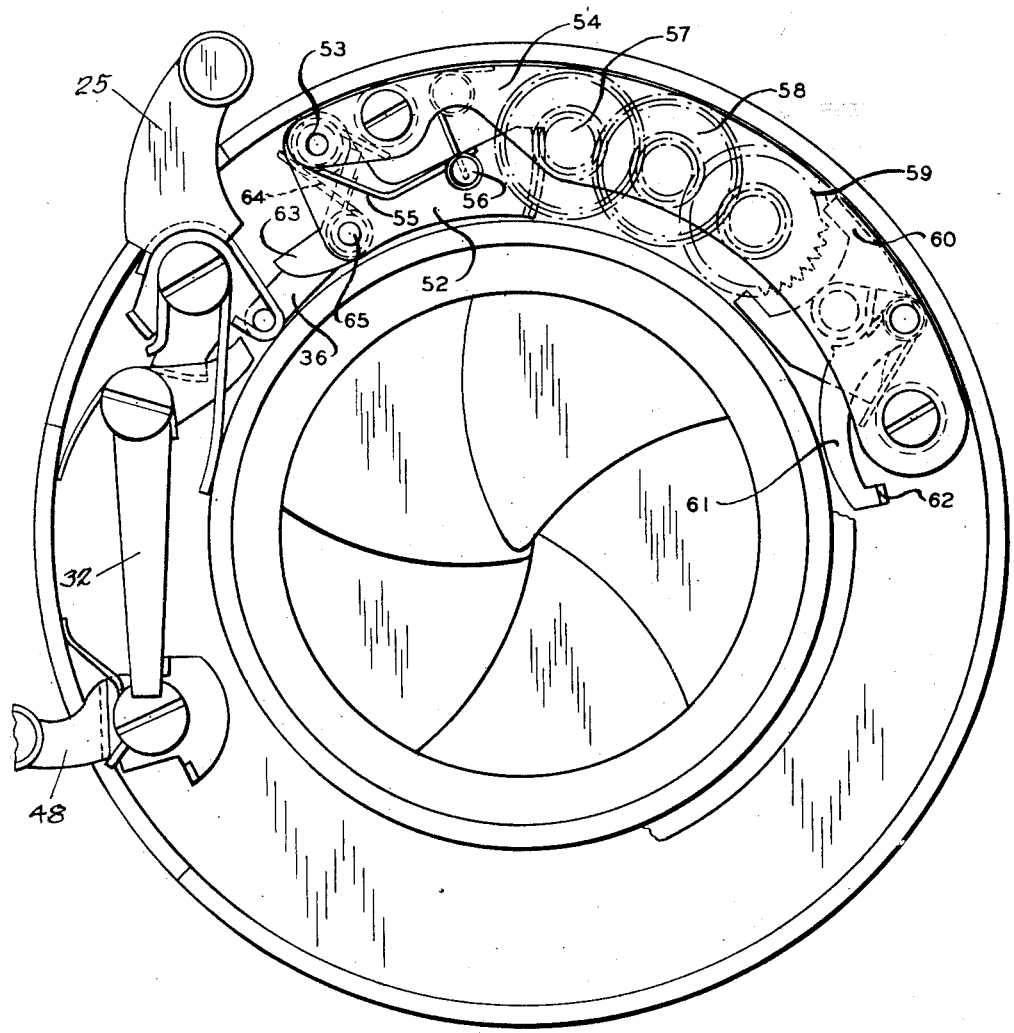
Fig. 3 is a view similar to Fig. 1 but showing the manner in which a conventional retard mechanism is superimposed upon the shutter actuating means.

The blade operating mechanism shown in Figs. 1, 2, and 3 includes a master member generally indicated by numeral 19 and pivoted at 20. This master member is preferably stamped out of sheet stock and comprises a central plate 21 suitably apertured for the pivot, and arms 22, 23, 24, and 25. The arm 22 is bent forwardly to form a lug 26 which serves to restrain the spring motor 27 which is coiled about pivot 20 and which extends at the opposite side of the pivot at 28 to bear against the outside of the central cylindrical casing portion 11. In addition to the function above mentioned, the lug 26 also serves to engage the nose 29 of a bell crank release lever pivoted at 30 and having arms 31 and 32. A spring 33 is coiled about pivot 30 and always maintains this release lever in the position of Fig. 1 except when withdrawn by the trigger to release the shutter.

The second arm 23 has a similar lug 34 which engages other levers (not shown) but which control operation during time and/or bulb exposures. The arm 24 comprises the crank or one link of the first toggle means. It has pivoted to it at 35 a link 36 which constitutes the second link of that toggle means. The fourth arm 25 extends through a slot in the casing member 12 and is adapted to be engaged by the photographer for cocking or setting the shutter.

The link 36 connects to a second toggle means comprising a bell crank having the arms 37 and 38 and pivoted at 39 and a link 40. The link 40 is pivotally connected at 41 to the arm 38 to form a joint, and at its opposite end, is connected by pin 42 to the blade ring 17, Figs. 1, 2, and 4. The arm 37 is turned upwardly to form a lug 43 which is engaged within a notch 44 at the relatively free end of link 36. A spring 45 coiled about pin 46 presses upwardly against a pin 47 projecting from the link 36 and maintains the notch 44 in engagement with the lug 43 except as later explained.

This second toggle means is urged to the position in which it is shown in Figs. 1 and 2 by a spring 48 coiled about the pivot 39 and engaging at one end with the edge of a cut-out notch or opening in the mechanism plate 14, and at its other end with the lug 43. The general tendency is thus to straighten the toggle joint and to maintain the blades in closed position.

When the cocking lever 25 is moved to the position of Fig. 2, the notch 44, the angular position of which at the start of movement is illustrated in Fig. 1, disengages lug 43 since the left-hand edge of the notch is really below the correpsonding end of the lug. That permits the mechanism to be set without disturbing the second toggle means and without disturbing the closed shutter blades. First the swinging of the arm 24 moves the link 36 to the right and then after passing dead center position, moves it a corresponding distance to the left whereupon notch 44 reengages the lug 43 under the influence of spring 45. In that position as can be seen from Fig. 2, movement of link 36 to the right will, through engagement with lug 43, swing the arm 37 of the bell crank about pivot 39 to move the second toggle mechanism to the dotted-line position of Fig. 2. Such movement thereof opens the blades through the interconnection with the blade ring. The remainder of the movement to initial position, Fig. 1, closes them.

When in fully cocked position, the lug 26 engages behind nose 29 of lever 31. For releasing the shutter, a conventional trigger 48 pivoted at 49 functions upon the arm 32 of the release mechanism to swing that lever 32 and integral lever 31 to withdraw the nose 29 from behind the lug 26. Trigger 48 is biased in one direction by the usual spring 50 and has a lug 51 which engages behind the lever 32 so that downward movement of the trigger effects the proper rotation of levers 31 and 32 about pivot 30.

The two toggle means are interconnected and function in series, but are out of phase. As shown in Figs. 1 and 2, when the first joint is in completely broken position (either released or set position), the second joint is straightened or in what might be termed its dead center position. When the blades are opened, the first joint will be at its straightened or dead center position and the second will assume the dotted-line position, Fig. 2, or its fully broken position. As will be explained more fully with respect to detailed operation, that relationship of parts results in the improved shutter operation, especially during closing of the blades.

Now referring to Fig. 3, the control for various shutter speeds includes a sector gear 52 pivoted at 53 between the mechanism plate and a smaller plate 54 which is more or less coextensive with the retarding means. This sector gear is urged in one direction by a spring 55 pivoted about the pivot point 53 and engageable with a projecting pin 56 adjacent the toothed end of the gear. The gear 52 meshes with a pinion 57 which drives a train comprising a plurality of pinions and gears generally indicated by numeral 58. The last member in the train comprises a star wheel 59 cooperating with a pallet 60, the latter being controllable by mechanism including a lever 61 having a forwardly projecting lug 62 engageable with the usual cam means illustrated in Fig. 5.

The sector gear 52 has projecting toward the master member an extension 63 which is held by a spring 64 in the position shown, Fig. 3, but which may be moved upwardly or in a clockwise direction about the pivot 65 to permit the master member, or certain projections thereon to pass by it as the shutter is moved to said position, Fig. 2. This extension 63 is not free to move in a counterclockwise direction beyond the point illustrated in Fig. 3 and thus when an appropriate projection (not shown) contacts the extension as the master member moves from set to unset position, it will cause movement of the sector gear 52 throughout an angular extent depending upon the initial position occupied by that gear. As is well known to those skilled in the art, the extent of the period during which the shutter blades remain in substantially open position may thus be controlled by the retard mechanism which is disengaged when the master member reaches a predetermined point in its movement.

Figure 5:
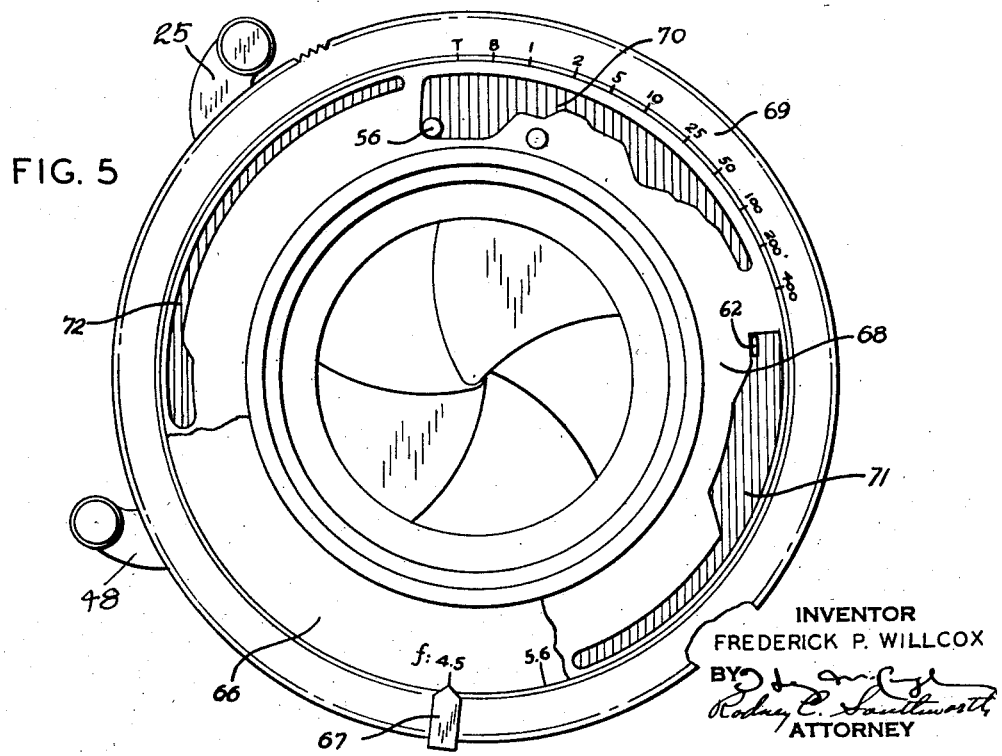
Fig. 5 is an elevation of the complete shutter as seen from the face thereof, part of the front plate having been broken away to show the control cams for speed settings, etc.

Now referring to Fig. 5, the general appearance of the shutter is shown, the face plate having been cut away to show the cams positioned beneath it. The face plate 66 is graduated with the usual f-stops against which a pointer 67 may be set to position the diaphragm. A cam plate 68 forming a part of the speed setting ring 69 has a cam slot 70 within which functions the pin 56 to determine the position of the sector gear for timing the various exposures. A second cam slot 71 serves to withdraw the pallet 60 at such times as it is not to affect the retarding train. The lug 62 is controlled by this slot 71. A third cam opening 72 acts upon certain lugs projecting from time and bulb levers (not shown), but which act in a more or less conventional manner to control these longer exposures.

Figure 7:
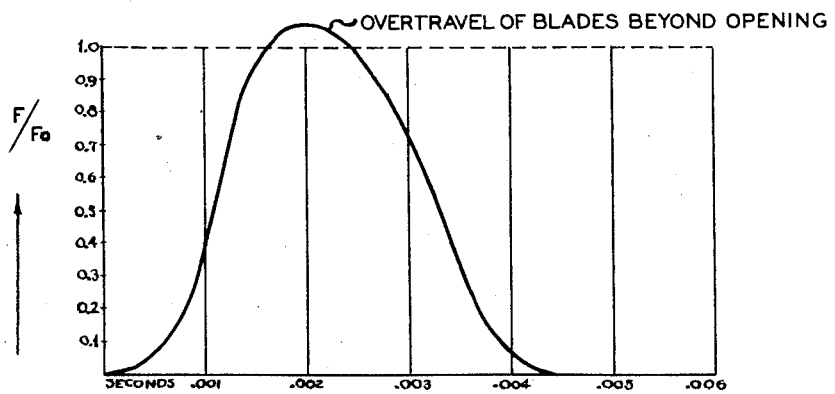
Fig. 7 is a similar view showing the manner in which the curve of Fig. 6 is modified by the double toggle means of this invention.

In operation, the speed ring may be assumed to have been set at one of the instantaneous speeds and for action of the mechanism in accordance with the curve shown at Fig. 7, it may be assumed that the fastest speed is to be employed for which, of course, there will be no contact between the master member and the retarding train. In other words, the shutter blades will be opened and closed as quickly as is possible considering the power in the spring motor and considering friction, inertia and other factors. These may vary with different shutters, but the general principles of operation remain the same.

As setting lever 25 is moved counterclockwise until the lug 26 engages the nose 29 of the release lever, the link 36 will be moved to the right, the notch 44 disengaging the lug 43 at that time. The arm 24 moves through its dead center position and then to the position of Fig. 2 at which time the notch 44 reengages the lug 43 and assumes the position of Fig. 2 which is maintained until the trigger 48 is employed for swinging the levers 31 and 32 so that toe 29 is withdrawn from the lug 26. Then the mechanism is free to move throughout its cycle for opening and closing the blades.

In opening the blades, the master member moves from the position of Fig. 2 down to a position in which the arm 24 and the link 36 reach a dead center or straightened position. As that movement of the first toggle means takes place, the arm 37 of the bell crank pivoted at 39 is swung through an arc thereby moving the second toggle means in the series to the dotted-line position. That results in an angular movement of the ring 17 such as is required to open the blades.

Figure 6:
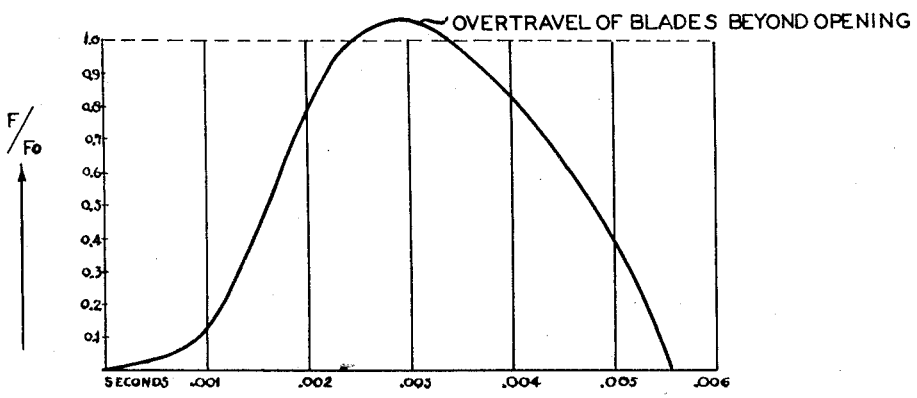
Fig. 6 shows a curve which illustrates conventional shutter operation.

An inspection of the curves in Figs. 6 and 7 will show that the double toggle mechanism affects the opening phase by imparting to the blades faster motion at the start. At the moment of release of the master member, the first toggle mechanism is at a position in which it would apply the least power to the blade ring. Since inertia and friction are at a maximum at that time and must be overcome before movement can be speeded up, the opening for the conventional shutter as illustrated in Fig. 6 starts at a relatively slow rate. The addition of the second toggle mechanism which functions at the start to exert maximum power, modifies the curve to that of Fig. 7, the change being due to the fact that the increase in total mechanical advantage at the initial opening of the shutter, allows the parts to reach a very high speed much earlier in the cycle.

After the members have travelled throughout a considerable distance in the opening phase, the action is not greatly different from that of Fig. 6.

After reaching the fully opened position, the blades are closed and the total closing time is considerably less for the operation as herein described compared to the closing time required for the shutter having only a single toggle or employing only the simple harmonic motion. However, the chief distinction in the closing phase is evidenced at the end of the cycle in which the blades are materially slowed down just prior to reaching fully closed position, that being in direct contrast to the operation of shutters functioning in accordance with Fig. 6 in which the highest speed is actually reached at the very end of the cycle.

The first toggle mechanism, at leaving its dead center position has very low velocity so far as movement of the link 36 is concerned, but the speed of the blades at that time is accentuated by the fact that the second toggle mechanism is at a position in which it imparts the greatest amount of movement to the ring 17, that is, considering angular movement of the parts themselves. As the first toggle mechanism approaches the end of its travel, it rapidly builds up the speed of the link 36 and that increase in speed is transferred to ring 17 by the second toggle mechanism throughout a good portion of the closing part of the cycle. However, prior to reaching the end of its movement, the second toggle arrives at substantially the straight (full-line) position of Fig. 2 in which it tends to negative or cancel out the relatively high speed reached by the link 36. That accounts for the change in direction of the curve at the closing end of the cycle in Fig. 7 and prevents the blades reaching a closed position while travelling at what would otherwise be practically the highest rate of speed they might attain at any point during the entire opening and closing movement.

As can be seen from an inspection of these curves, Figs. 6 and 7, the shutter blades are actually opened more rapidly and are closed more rapidly when functioning according to this invention. The opening and closing movements are more nearly balanced and are slowed down prior to reaching fully opened and fully closed positions, the opposite being true of the single toggle system of operation. While the discussion herein given is of the highest speed, the same applies in a general way, and, in fact, in practically the same way for other shutter speeds. The only difference is that at the fully opened position, there is a dwell controlled by the retard mechanism. Naturally, the opening movement is not altered by the dwell which comes about only after the parts have reached their substantially open position. The closing movement may not be started quite so rapidly for other than the highest or non-interrupted shutter speed, but the same general principles apply in that the closing movement will be started more rapidly for the present than for the conventional or single toggle operation. At the close of the cycle, the curve would coincide very closely with that of Fig. 7.

The invention has been described by reference to one form thereof, but it is to be understood that there are various different types of shutters to which it may be applied. The master member herein illustrated is simple and is one in which the setting lever forms an extension or part of the master member itself. In many shutters, the setting lever is remote from the master member and operates thereon through appropriate connections. That type of construction is well adapted to employment of the principles and mechanism herein described. The blades as illustrated in Fig. 4 are normally controlled to actuate in unison by a so-called blade ring which may take any one of many different forms, and which, in fact, may be supplanted by other mechanism so long as the blades are simultaneously opened and closed and so long as the second toggle means is connected either directly or indirectly to some blade interconnecting and actuating means.

In this description and in the following claims, reference is made to "toggle means." It is realized that the means to which reference is made is not, strictly speaking, a toggle "joint." However, the function is very similar and the terms herein employed convey the concept better than other known terminology. When reference is made to straightened or dead center position, it is intended to include positions near or substantially at that which might be understood by strict interpretation of these terms. The two toggle means are set in nearly or substantially an opposite phase relationship, but some latitude is possible so that the exact opposite relationship need not be provided for obtaining the advantages of the method and mechanism as described.

While one embodiment of the invention has disclosed, it is to be understood that the inventive concept may be carried out in a number of ways. This application is, therefore, not to be limited to the precise details described but is intended to cover all variations and modifications thereof falling within the spirit of the invention and the scope of the claims.

I claim:

1. In a photographic shutter, a plurality of pivoted shutter blades, means for interconnecting and for imparting opening and closing movements to said pivoted blades, a master member and a pivot therefor about which said member may be swung through a predetermined arc, a tensioned spring for said master member and a release mechanism for maintaining said member in cocked position against the tension of said spring, and means for conveying the movement of said master member, when released, to said blades through the blade interconnecting means which includes two toggle means in series, the first said toggle means comprising an arm forming a part of the master member and a link pivoted thereto, said arm being so disposed as to impart motion to said link, said second toggle means comprising two interconnected links, one of which is movable about a fixed pivot, and the other of which is connected to that means for imparting movement to the said pivoted blades, and a releasable connection between said toggle means including an arm functionally integral with the first link of the second toggle means for swinging it about its fixed pivot, a lug projecting from said arm and a notch in the pivoted link of the first mentioned toggle means engageable with said lug, the said two toggle means being so disposed that when one is in substantially straightened position, the other is in substantially its fully broken position.

2. In a photographic shutter, a plurality of pivoted shutter blades, means for interconnecting and for imparting opening and closing movements to said pivoted blades, a master member and pivot therefor about which said member may be swung through a predetermined arc, a tensioned spring for said master member and a release mechanism for maintaining said member in cocked position against the tension of said spring, and means for conveying the movement of said master member, when released, to said blades through the blade interconnecting means which includes two toggle means in series, the first said toggle means comprising an arm forming a part of the master member and a link pivoted thereto, the said arm being movable with the master member so as to impart motion to the link, said second toggle means comprising one arm of a bell crank having a relatively fixed pivot and a second link engaged with the means for imparting movement to said pivoted blades and pivoted to the above mentioned arm of the bell crank, the second arm of said bell crank having a lug for engagement with the link of said first mentioned toggle means, said link having a notch for engagement with the said lug, a spring for urging the link in a direction to maintain engagement between its notch and the lug, the said two toggle means being so disposed that when the first is in a position such that the lever to which the first mentioned link is connected is in either one of those extreme positions, the second mentioned toggle means will be in its substantially straightened or dead center position.

FREDERICK P. WILLCOX.

REFERENCES CITED

The following references are of record in the file of this patent:

UNITED STATES PATENTS

| Number | Name | Date |
| --- | --- | --- |
| 444,083 | Bausch et al. | Jan. 6, 1891 |
| 815,552 | Perry | Mar. 20, 1906 |
| 1,483,465 | Marks | Feb. 12, 1924 |
| 1,626,032 | Fairchild | Apr. 26, 1927 |
| 1,701,121 | Riddell | Feb. 5, 1929 |
| 1,861,257 | Barenyi | May 31, 1932 |
| 2,176,621 | Brueck | Oct. 17, 1939 |
| 2,382,624 | Fuerst | Aug. 14, 1945 |